US011982179B2

(12) United States Patent
Hoarau et al.

(10) Patent No.: US 11,982,179 B2
(45) Date of Patent: May 14, 2024

(54) DRILLING RIG CONTROL SYSTEM AND METHOD

(71) Applicant: Schlumberger Technology Corporation, Sugar Land, TX (US)

(72) Inventors: Loic Hoarau, Houston, TX (US); Ricardo Quirch, Katy, TX (US); Njaal Aarsland, Vigrestad (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 54 days.

(21) Appl. No.: 17/905,334

(22) PCT Filed: Mar. 5, 2021

(86) PCT No.: PCT/US2021/021115
§ 371 (c)(1),
(2) Date: Aug. 31, 2022

(87) PCT Pub. No.: WO2021/178817
PCT Pub. Date: Sep. 10, 2021

(65) Prior Publication Data
US 2023/0184100 A1 Jun. 15, 2023

Related U.S. Application Data

(60) Provisional application No. 62/985,477, filed on Mar. 5, 2020.

(51) Int. Cl.
*E21B 47/12* (2012.01)
*E21B 47/26* (2012.01)

(52) U.S. Cl.
CPC .............. *E21B 47/12* (2013.01); *E21B 47/26* (2020.05); *E21B 2200/20* (2020.05)

(58) Field of Classification Search
CPC ...... E21B 47/12; E21B 47/26; E21B 2200/20; E21B 44/00; E21B 7/00
See application file for complete search history.

(56) References Cited

U.S. PATENT DOCUMENTS 6,944,547 B2    9/2005  Womer et al.
2005/0271128 A1*  12/2005  Williams ............ H04L 43/0817
                                              375/222

(Continued)

FOREIGN PATENT DOCUMENTS

CN       2698978 Y       5/2005
WO    2016102381 A1      6/2016

(Continued)

OTHER PUBLICATIONS

Search Report and Written Opinion of International Patent Application No. PCT/US2021/021115 dated Jun. 9, 2011, 11 pages.

(Continued)

*Primary Examiner* — Amine Benlagsir
(74) *Attorney, Agent, or Firm* — Jeffrey D. Frantz

(57) ABSTRACT

A system and method for controlling a drilling rig, of which the method includes receiving a first message-based command from a supervisory system at a first gateway, determining a first system-specific command based on the first message-based command using the first gateway, and transmitting the first system-specific command from the first gateway to a first system-specific controller. The first system-specific controller is configured to execute the first system-specific command by controlling first rig equipment, but is not configured to execute the first message-based command.

18 Claims, 7 Drawing Sheets

(56) References Cited

U.S. PATENT DOCUMENTS

2010/0147589 A1* 6/2010 Wingky ............. G06F 9/45512
                                                                 175/40
2016/0290119 A1* 10/2016 Tunc ...................... E21B 44/00
2018/0359130 A1   12/2018 Zheng et al.
2019/0158457 A1*  5/2019 Donaldson .......... H04L 61/5076
2019/0387397 A1* 12/2019 Cao ........................ H04L 69/00
2020/0003028 A1   1/2020 Weatherhead et al.
2020/0003046 A1   1/2020 Zheng et al.

FOREIGN PATENT DOCUMENTS

WO    WO-2016102381 A1 *  6/2016
WO       2021072396 A1     4/2021

OTHER PUBLICATIONS

Extended Search Report issued in European Patent Application No. 21763615.8 dated Feb. 9, 2024, 7 pages.

* cited by examiner

DRILLING RIG CONTROL SYSTEM AND METHOD

CROSS-REFERENCE TO RELATED APPLICATIONS

This application is a National Stage and claims benefit of PCT Patent Application No. PCT/US2021/021115, filed on Mar. 5, 2021, which claims priority to U.S. Provisional Patent Application having Ser. No. 62/985,477, which was filed on Mar. 5, 2020, each of which is incorporated by reference in its entirety.

BACKGROUND

Drilling rigs are used to drill wellbores into a subterranean formation, e.g., to reach a hydrocarbon reservoir beneath the Earth's surface. The drilling rigs may also be employed for a variety of completion operations, such as casing, cementing, treating, etc., the well, to support production of fluids from the reservoir via the well. The rigs are large, complex machines, which may employ several humans and several systems to control.

Recently, the industry has trended toward greater automation of rig processes via computer-control of the rig control system. However, rigs are manufactured by a variety of different companies, and each may have its own rig control system. The different rig control systems may vary widely in terms of implementation. It is, therefore, difficult for an automation system to interface with the different systems, without a large amount of customization of the centralized system.

SUMMARY

Embodiments of the disclosure include a method for controlling a drilling rig. The method includes receiving a first message-based command from a supervisory system at a first gateway, determining a first system-specific command based on the first message-based command using the first gateway, and transmitting the first system-specific command from the first gateway to a first system-specific controller. The first system-specific controller is configured to execute the first system-specific command by controlling first rig equipment, but is not configured to execute the first message-based command.

Embodiments of the disclosure also include a control system for a drilling rig. The system includes a supervisory system configured to implement a well plan by generating message-based commands for execution using rig equipment, and a system controller in communication with the supervisory system. The system controller includes a gateway in communication with the supervisory system, the gateway comprising a database that associates the message-based commands with system-specific commands, and a system-specific controller coupled to the gateway and to rig equipment, wherein the system-specific controller is configured to execute the system-specific commands received from the gateway by adjusting operation of the rig equipment, and wherein the system-specific controller is not configured to execute the message-based commands.

Embodiments of the disclosure also include a non-transitory computer-readable medium storing instructions that, when executed by at least one processor of a computing system, cause the computing system to perform operations. The operations include receiving a first message-based command from a supervisory system at a first gateway, determining a first system-specific command based on the first message-based command using the first gateway, and transmitting the first system-specific command from the first gateway to a first system-specific controller, wherein the first system-specific controller is configured to execute the first system-specific command by controlling first rig equipment, but is not configured to execute the first message-based command.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

Features of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD").

As an example, a well design system can account for one or more capabilities of a drilling system or drilling systems that may be utilized at a wellsite. As an example, a drilling engineer may be called upon to take such capabilities into account, for example, as one or more of various designs and specifications are created.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

Figure 1:
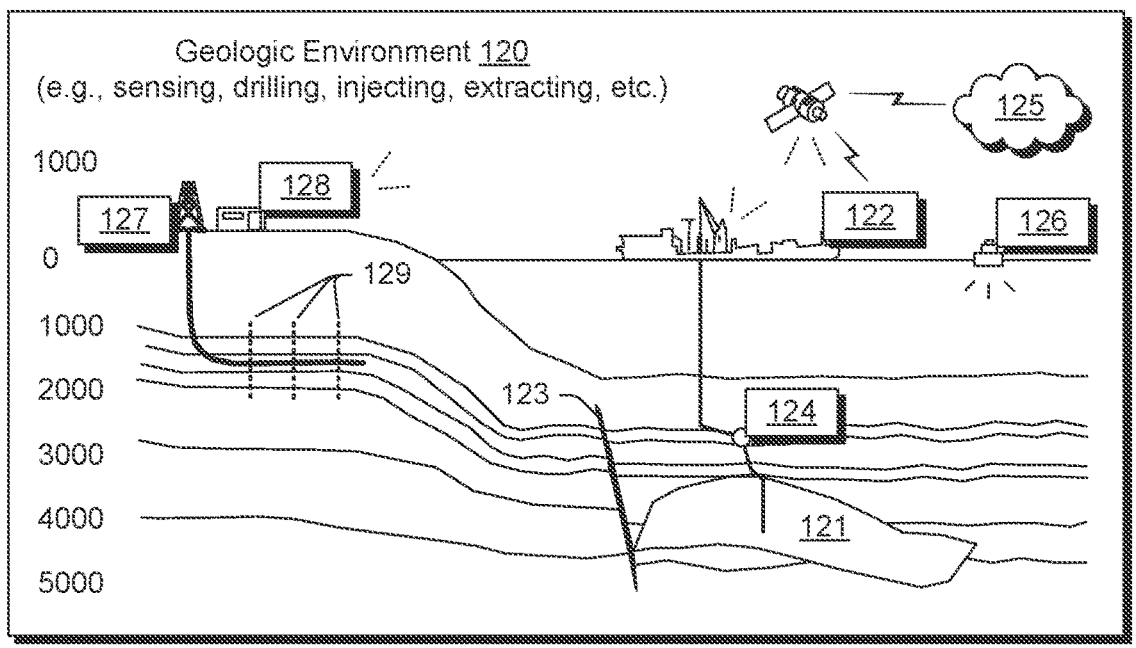
FIG. 1 illustrates examples of equipment in a geologic environment, according to an embodiment.
Figure 1:
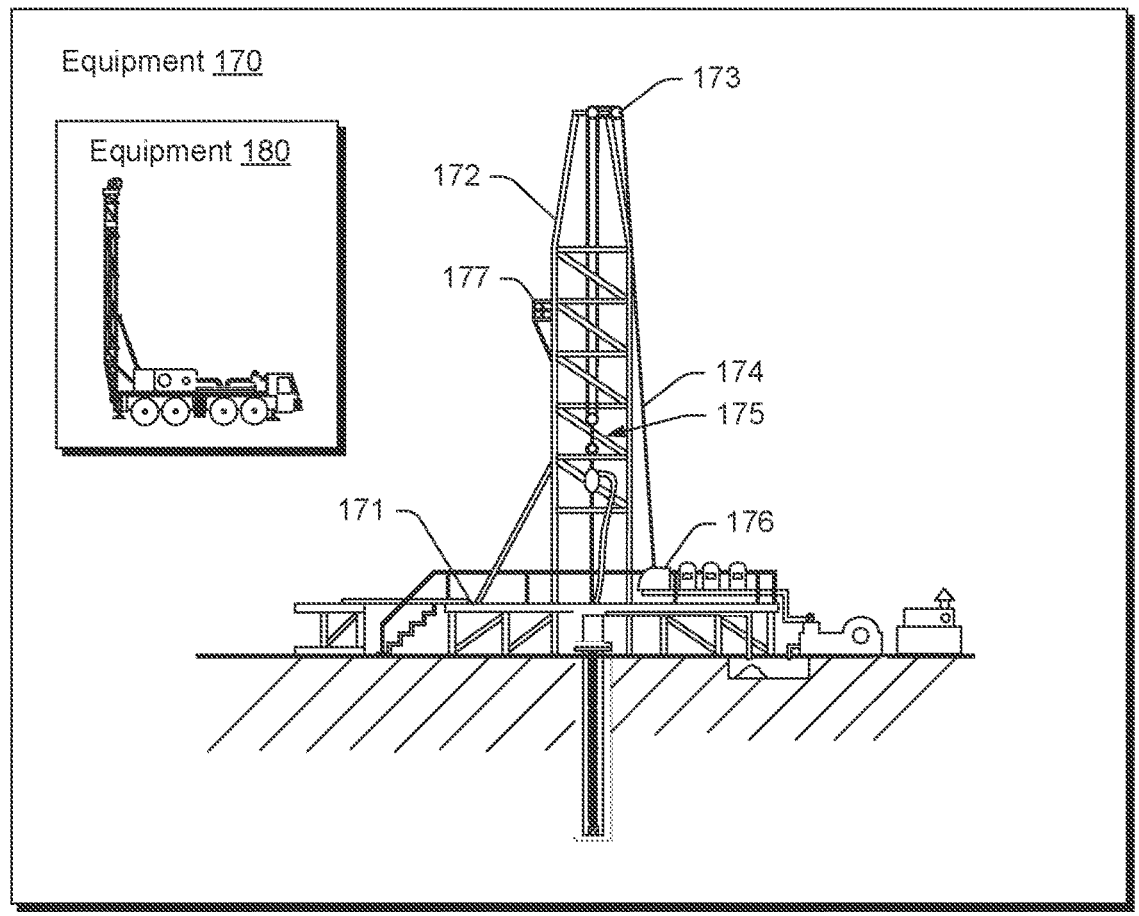

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block assembly 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
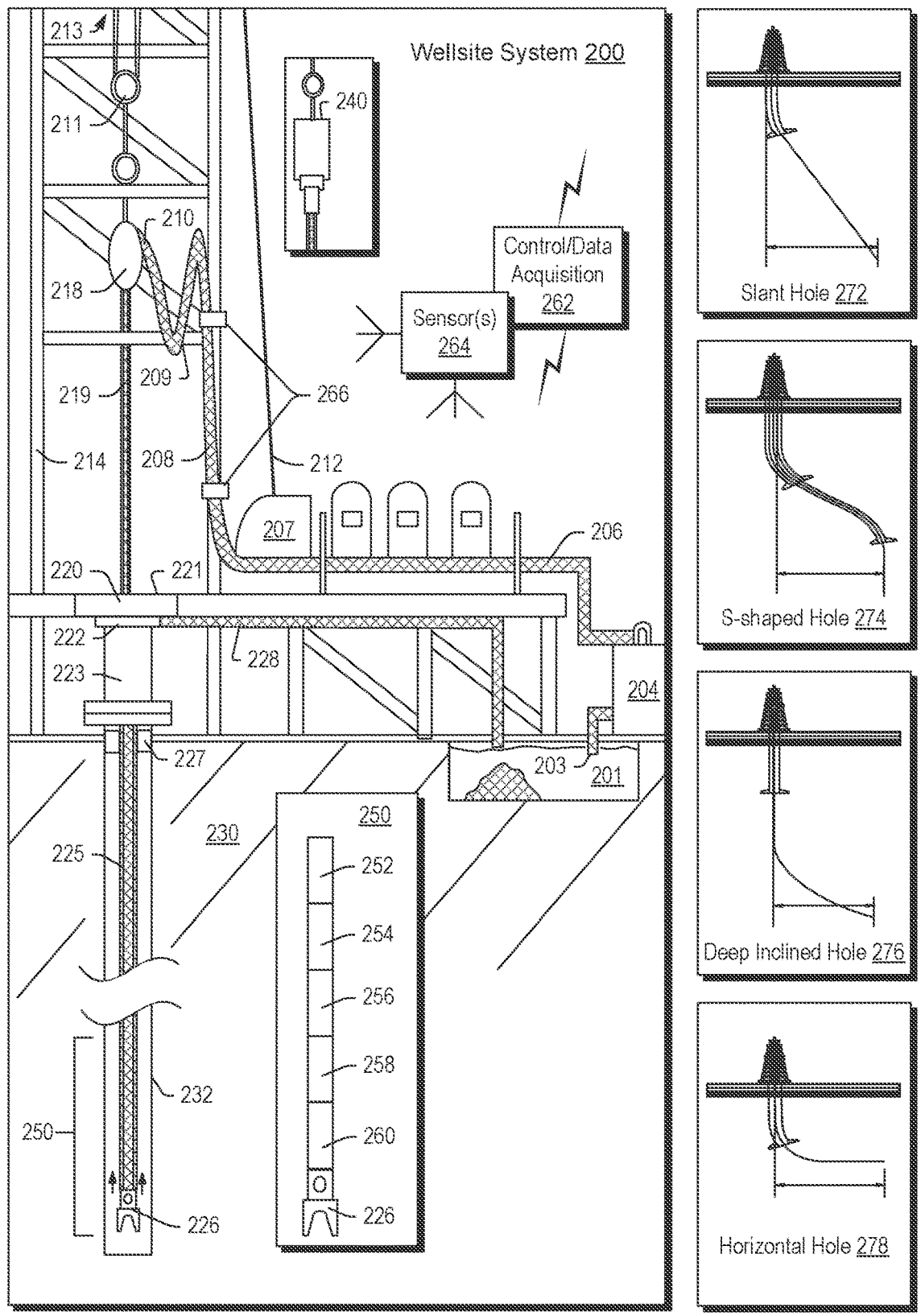
FIG. 2 illustrates an example of a system and examples of types of holes, according to an embodiment.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It may also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
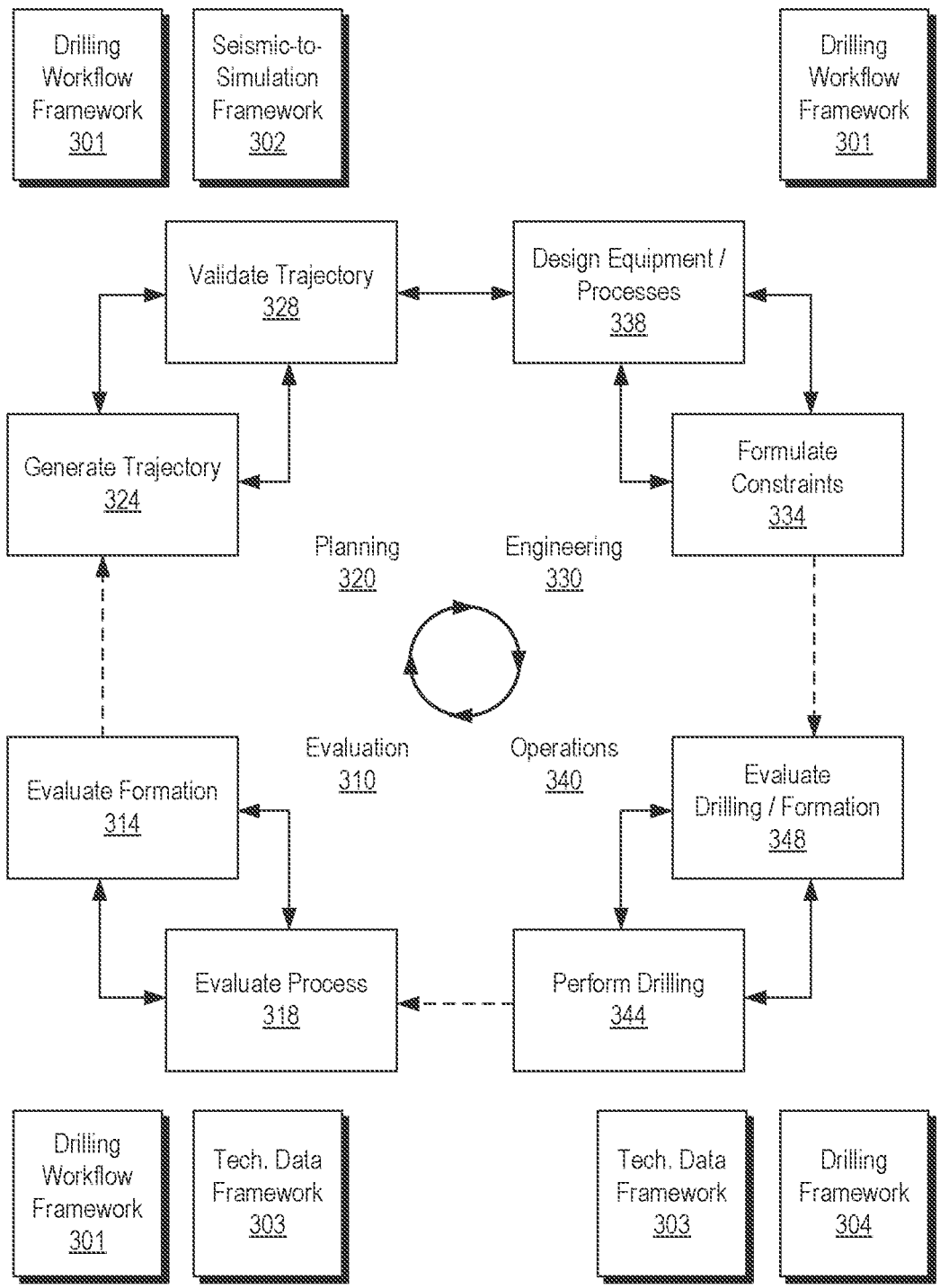
FIG. 3 illustrates an example of a drilling system, according to an embodiment.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Texas) and the technical data framework 303 can be, for example, the TECHLOG® framework (Schlumberger Limited, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™.NET™ framework (Redmond, Washington), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Texas), the INTERSECT® reservoir simulator (Schlumberger Limited, Houston Texas), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Texas), which allows for integration of add-ons (or plug-ins) into a PETREL® framework workflow. The OCEAN® framework environment leverages .NET™ tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Texas) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
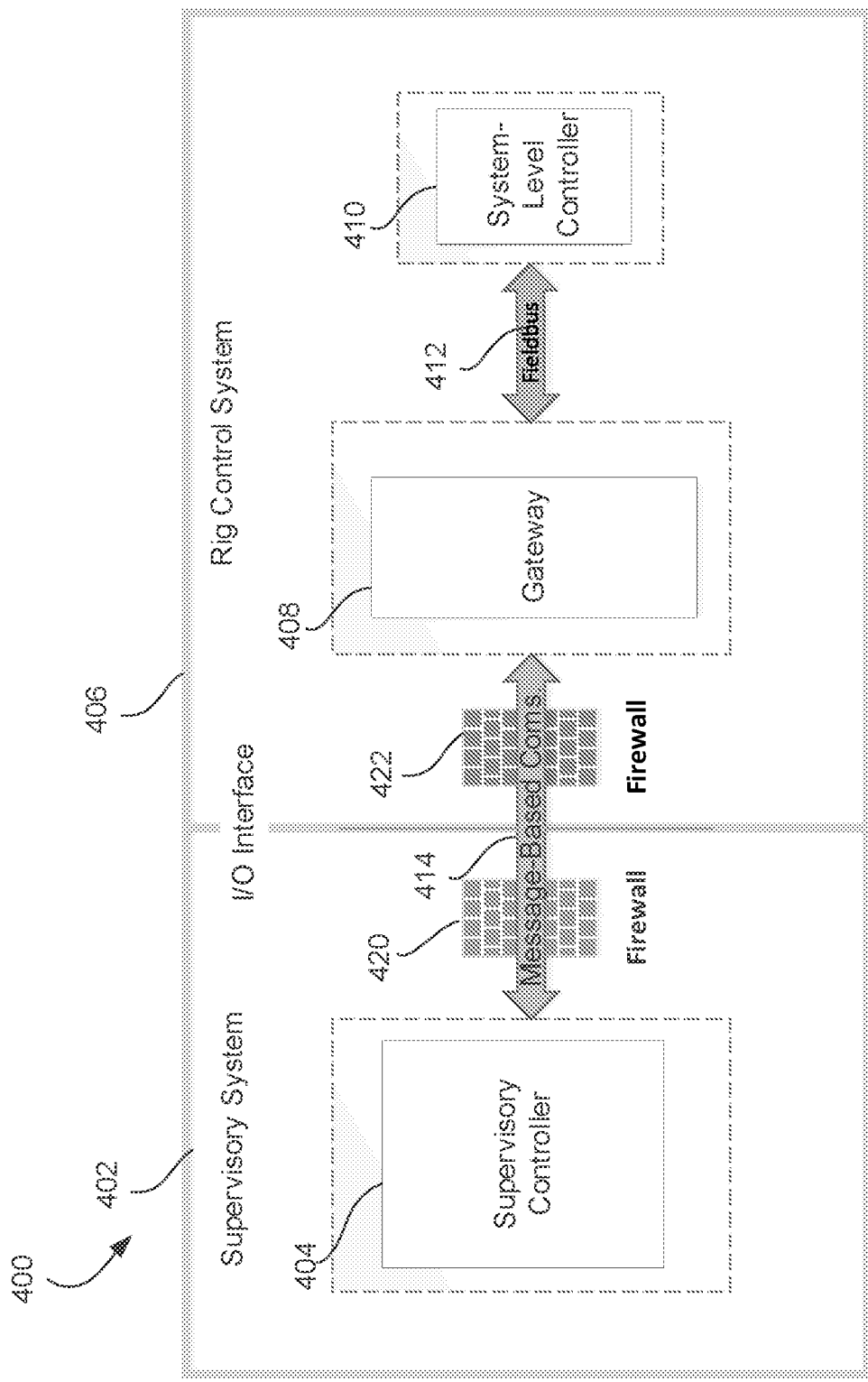
FIG. 4 illustrates a schematic view of a system for controlling a rig, according to an embodiment.

FIG. 4 schematically illustrates a control system 400, e.g., for a drilling rig, according to an embodiment. The control system 400 may include a supervisory system 402 and a rig control system 406. The supervisory system 402 may include a controller 404, e.g., a computing system, as discussed below. The supervisory system 402 may be designed to implement a well plan, by communicating with a plurality of different rig systems, e.g., top drive, drawworks, mud pump, autodriller, depth managers, etc. The well plan may prescribe various drilling actions, completion actions, intervention actions, etc. The well plan may also specify parameters for rig equipment, and those parameters may be updated, e.g., in real time, as sensor feedback, equipment status, etc. may dictate. The supervisory system 402 may generate "message-based" commands to implement such well plan actions. These message-based actions may be relatively high-level, and may be selected from a standardized library for implementation at the rig system level. Thus, more generally, the supervisory system 402 may collect sensor data provided by individual rig components and automation at the drilling process level, thereby coordinating the activities of the different rig components automatically in furtherance of a planned process (e.g., a well plan).

At the system-specific level, the rig control system 406 may include a gateway 408 and one or more controllers 410. The controller 410 may be connected to or otherwise in communication with rig equipment, i.e., physical elements (machinery) of the rig equipment discussed above. The controller 410 may be configured to communicate with the rig equipment, and such communication may be accomplished through system-specific communications that are not standardized across different vendors, hardware types, etc., but rather tailored for implementation by the individual system-specific controller 410. Specifically, the controller 410 may be or include one or more programmable logic controllers provided for individual actuators. The controller 410 thus may be configured to receive sensor data, provide relatively low-level commands (e.g., on/off, position, speed, etc.) to the actuator, in furtherance of the overall well plan and the high-level commands being generated by the supervisory system 402.

In order to generate such low-level commands from the high-level message-based commands, the gateway 408 may include a processor and a database, with the database storing associations between message-based commands generated by the supervisory system 402 and one or more (potentially several) system-specific commands. Thus, the gateway may serve to "translate" the standardized, message-based commands from the supervisory system 402 into system-based commands that may be implemented by the controller 410.

The message-based commands may take the form of standardized function calls, e.g., as an application-program interface (API) library. The gateway 408 may be provided to convert these standardized function calls (message-based commands) into system-specific commands that the controller 410 is configured to execute. Further, the API function calls may specify return parameters, such as error codes, sensor feedback values, etc., which may provide a return path for communications back from the system-specific controller 410 to the supervisory system 402. A specific field bus 412 may be provided for executing the system-specific commands in the controllers 410. A standardized communication path (e.g., for passing OPC-UA automation messages) between the supervisory system 402 and the gateway 408 may also be included.

One or more firewalls 420, 422 may also be provided between the supervisory system 402 and the system-specific controller 406. The firewalls 420, 422 may be configured to prevent one system from unauthorized access to the other system, in either direction. Thus, for example, the firewall 420 may prevent attacks initiated from the gateway 408 or the controller 410 from reaching other systems via the supervisory system 402. Likewise, the firewall 422 may prevent spurious commands from the supervisory system 402 from reaching the gateway 408 and/or the controller 410. The provision of two firewalls 420, 422 may permit a supervisory entity responsible for the supervisory system 402 to control communications access to its system 402, while also permitting an implementation entity (e.g., drilling operator, etc.) to control communications access to its system 406, thereby potentially addressing issues for attack or other unauthorized access from either direction.

Moreover, the process of establishing a connection between the controller 404 of the supervisory system 402 and the gateway 408 may be secured, e.g., using certificates and by manually verifying such new connections (by human intervention). Thus, while the present disclosure may reduce human-led efforts to configured different systems to communicate with a central controller, some human intervention may be permitted, e.g., to ensure security.

Figure 5:
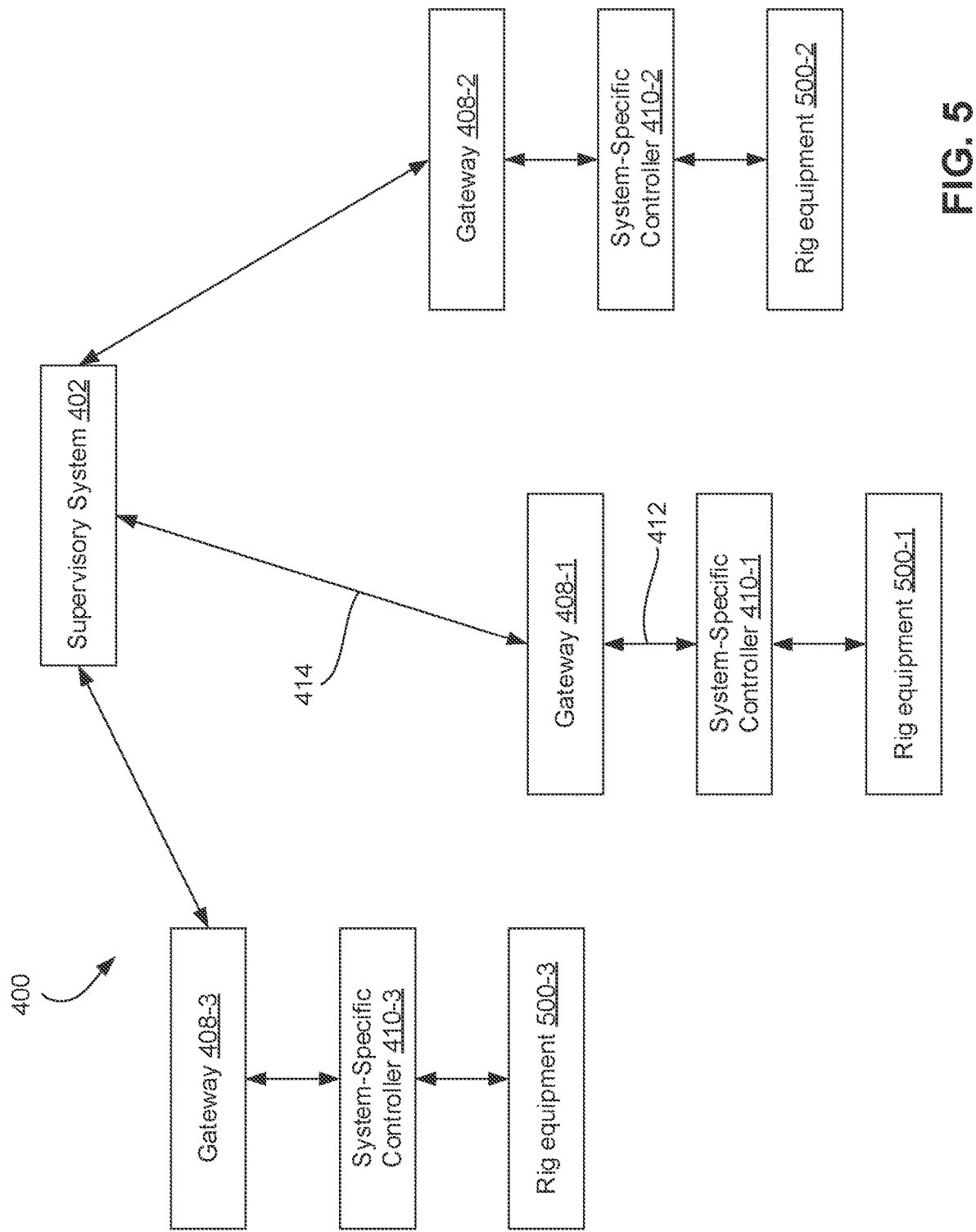
FIG. 5 illustrates another schematic view of the system, according to an embodiment.

FIG. 5 illustrates another schematic view of the system 400, according to an embodiment. As shown, the supervisory system 402 may be configured to communicate with a plurality of systems-specific controllers 410-1, 410-2, and 410-3 via a plurality of gateways 408-1, 408-2, 408-3. In turn, the system-specific controllers 410-1, 410-2, and 410-3 may be configured to adjust operation of rig equipment (e.g., actuators) 500-1, 500-2, and 500-3. In particular, as shown in FIG. 5, the standardized communication link 414 is made between the supervisory system 402 (e.g., the controller 404 thereof) and the individual gateways 408-1, 408-2, 408-3. The supervisory system 402 may thus be configured to convey messages in a single "language", e.g., via function calls through an API. In turn, the gateways 408-1, 408-2, 408-3 may have at least some of these functions mapped to system-specific commands (potentially a sequence of commands, routines, etc.). These system-specific commands may then be transmitted to the individual system-specific controllers 410-1, 410-2, and 410-3 via the specific fieldbus 412, and then implemented by the system-specific controllers 410-1, 410-2, 410-3. Moreover, status/feedback, whether as part of a heartbeat (intermittent status report) or a polling/response to interrogation from the supervisory system 402 may be provided back from the rig equipment 500-1, 500-2, 500-3 to the supervisory system 402.

That is, system-specific signals may be provided to the gateways 408-1, 408-2, 408-3, which may translate these system-specific signals to message-based signals (e.g., return values for function calls) that are sent to the supervisory system 402. Thus, the gateways 408-1, 408-2, 408-3 provide a layer of "abstraction" that separates the supervisory system 402 from the systems-specific controllers 410-1, 410-2, 410-3, thereby permitting the controllers 410-1, 410-2, 410-3 to be configured to implement different commands or otherwise be unable to convey data therebetween or execute the same types of commands, while avoiding reconfiguration of the supervisory system 402 in order to establish the system 400. Accordingly, vendor-provided controls systems tailored for individual pieces of rig equipment may not be standardized, but may retain their native languages; however, the gateways 408-1, 408-2, 408-3 may be provided to accompany such vendor-provided control system, potentially also provided by the vendor, which serve to translate between the supervisory system 402 and the system-specific controllers 410-1, 410-2, 410-3 without calling for the supervisory system 402 to be reconfigured.

Figure 6:
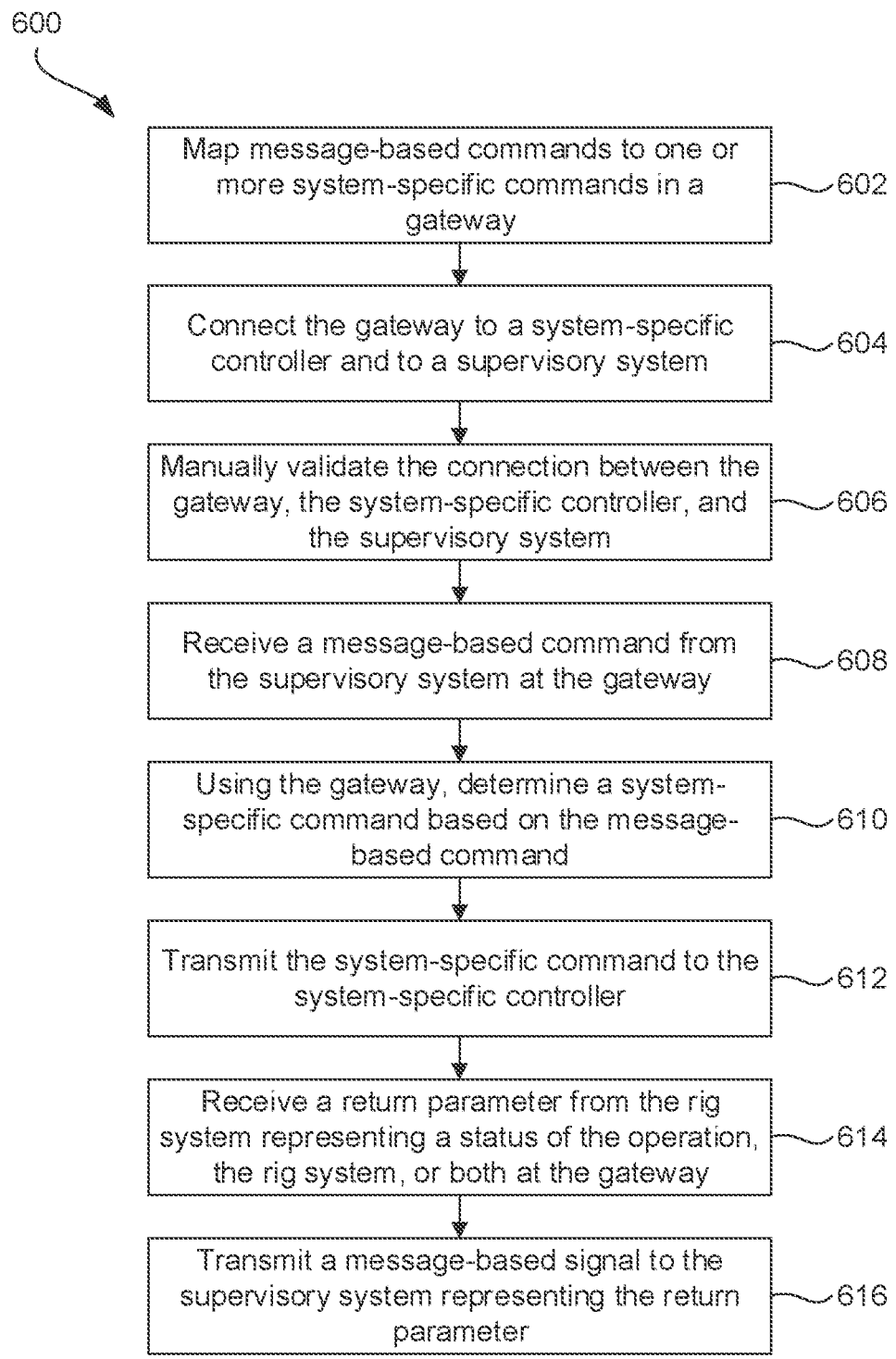
FIG. 6 illustrates a flowchart of a method for controlling a drilling rig, according to an embodiment.

FIG. 6 illustrates a flowchart of a method 600 for controlling a drilling rig, according to an embodiment. It will be appreciated that the blocks of this method may be performed in the order illustrated, or in other orders, and/or the various blocks may be combined, separated, performed in parallel, etc. without departing from the scope of the present disclosure.

The method 600 may include mapping message-based commands to one or more system-specific commands in a gateway 408, as at 602. As discussed above, the gateway 408 may be a systems-level component that is configured to translate between message-based commands and system-specific commands. The gateway 408 may be provided for individual rig systems, and thus the drilling rig as a whole may include several such gateways 408. The associations may be made in flat memory, and may interact with an API in order to translate standardized function calls via the API into system-specific commands that are configured to cause specific rig controllers to execute relatively low-level tasks. In some embodiments, a single system-specific command may be translated into several low-level commands by the system-specific controller 410. The mapping process may, in at least some embodiments, be conducted manually prior to installation of the rig equipment at the drilling rig.

The method 600 may also include connecting the gateway 408 to a system-specific controller 410 that implements the system-specific commands and to a supervisory system 402 that generates the message-based commands, as at 604. As discussed above, such connection may permit bidirectional communication of commands and sensor feedback/equipment status between the system-specific controller 410 and the supervisory system 402.

The method 600 may also include validating the connection between the gateway 408, the system-specific controller 410, and the supervisory system 402 manually, as at 606. This may be conducted on a trust on first use (TOFU) basis, e.g., using verified certificates to ensure each connection is authentic. Moreover, one or more firewalls 420, 422 may be implemented in order to partition the individual systems so as to protect them from attack.

The method 600 may further include receiving a message-based command from the supervisory system 402 at the gateway 408, as at 608. The gateway 408 may then determine one or more (e.g., a series of) system-specific commands based on the message-based command, as at 610. This may be done, for example, by reference to the result of the mapping done at 602, e.g., by reference to a database accessible to or forming part of the gateway 408.

The method 600 may then include transmitting the system-specific command to a system-specific controller 410, as at 612. The system-specific controller 410 may in turn execute the command or commands by adjusting operation of an actuator or another rig component or piece of rig equipment (e.g., 500-1, 500-2, 500-3) connected thereto, potentially several times. It will be appreciated that the system-specific controller 410 may be unable to or otherwise not configured to execute commands that are specific to other controllers 410 of the system 400. As such, the message-based commands provide a "universal" language that is accessible to each of the specific rig systems via the gateways 408.

The method 600 may include receiving a return parameter from the rig system, representing a status of operation, the rig system, or both at the gateway 408, as at 614. As noted above, this may be automatic, e.g., as part of a system heartbeat that provides intermittent check-ins as to system status, health, etc. In other cases, such a return parameter may be provided in response to an interrogation command from the supervisory system 402.

The supervisory system 402 may not be configured to recognize the system-specific feedback parameters received at the gateway 408 for the different systems. Accordingly, the gateway 408 may again translate, e.g., by creating message-based feedback signals that may then be transmitted to the supervisory system 402, as at 616.

Specific implementations for certain aspects of the present disclosure are now presented by way of example, but not by way of limitation.

I/O Interface Implementation

The I/O interface may define the signals and behaviors that a programmable logic controller software developer may follow to integrate his/her actuator with the system. The interface may have a structure that allows it to transition "message based" commands to flat memory mapped structures used by PLCs. It may also have a structure that allows for seamless transition between local and remote control (e.g., non-fluctuating setpoints).

Hence, the I/O interface proposed has mechanisms for a programmable logic controller to detect new incoming commands without confusing them with initial values. It has mechanisms to check authorization before handing control and to check on the health of the remote-control system to always know whether it is safe to remain in remote control.

Actuator Commands

To track new commands coming into the rig control system and distinguish them from old setpoints or uninitialized data, the following system is used. A command is mapped to an OPC-UA method and parameters are sent along the call. The OPC-UA method is linked to a programmable logic controller (programmable logic controller) function block which may take the parameters, validate them, and send a reply to the client that it is starting to execute the command. That way, the command is not blocking (e.g., the system does not have to wait for a block movement to complete before sending the next one).

The gateway may keep the active parameters and a command active flag may be put in status, so the client can check at any time what is the status of the rig control system. If a new command arrives while the previous action is executing, the previous operation is cancelled, and the new command takes effect with the new parameters.

Commands may have one return parameter. FaultCode may include bitwise defined fault codes. Lower 16 bits are common codes defined for the equipment. Higher bits may be customized in different implementations. Fault code parameters may also be available in the Outputs section of each actuator.

The fault code parameter may be treated as a state and updated in real time as conditions occur. The commands and status flowing through the I/O interface may be sent on an industrial fieldbus running at a fixed cycle time. The maximum rate at which commands (or inputs) may be accepted from the remote system may be slower than the fieldbus cycle time. Commands sent faster than the maximum command rate may be dropped in the I/O bridge.

For the statuses, the I/O bridge should be expected to be close to the performance of the fieldbus cycle time.

Setpoint Min/Max governing principles.

If a setpoint is received that is outside of the envelope enforced by the min and max values, the rig control system may take the following actions: if the setpoint is less than the min, it may be made equal to the min; if the setpoint is greater than the max, it may be made equal to the max; if the setpoint is within the operating envelope it may be processed as is.

Unit Handling

Unit handling for inputs and outputs is following the OPC-UA standard: the units are specified in the Engineering Attributes attached to the node in the OPC-UA model. The actual unit is specified as the string of the Value.displayName of EngineeringUnits The list of allowed units may be defined by the OPC-UA, potentially with some additional, custom measurements. Inputs or outputs that do not have an EngineeringUnit attribute may be considered unitless. This information may be static and remain unchanged once the server is up.

Communications Health Check

Communications health checks may be provided and may implemented using a two-way heartbeat technique to ensure that both the rig control system and the remote-control system, can detect communication failure or unresponsiveness of their counterpart and take appropriate measure to ensure safety of the system:

Each actuator programmable logic controller on the rig control system may implement an incrementing an integer to be sent to the remote-control system. This heartbeat is updated and sent at the fastest cycle time available over the gateway network interface. The supervisory system may implement an incrementing integer to be sent to each actuator programmable logic controller on the rig control system. This heartbeat may, for example, be updated and/or sent no slower than 5 Hz frequency.

Each system may monitor the heartbeats to determine whether the connection is alive on every cycle. If a certain number, e.g., three, cycles are missed the connection may be treated as down. The remote system and the rig control system may revoke remote control authority if the connection is treated as down. In addition to the heartbeat, both the remote-control system and each programmable logic controller actuator may set a BooleanReady flag to true, signaling it is ready to take control of the remote-control system, or that its data is valid and is ready to be controlled, in the case of the actuator. This flag serves a similar purpose to the heartbeat. It is to check that the systems are healthy on each side. But it allows a quicker response in case of communication issues, where typically I/O default to zeros on programmable logic controller.

Echo Functionality

An echo functionality may be implemented to measure data roundtrip time between the remote-control system and the actuator programmable logic controller. This round-trip time may be used for statistical measurement of the actual data latency in the system. It may be an input for control system engineers to consider when designing remote control applications. The remote-control system heartbeat may serve as the "echo in" parameter to the programmable logic controller, and will be sent back as an "echo out" from the programmable logic controller.

Programmable Logic Controller Software and Interface Versioning

To check software compatibilities at integration, the standard I/O defines output for each programmable logic controller to send back the version of software they are running and the version of the standard I/O interface that is supported.

Granting and Revoking Authority

For each actuator, the remote-control system is granted authority by an action of the Driller on the rig control system interface itself. The following conditions may be met for the rig control system to authorize control:
 1. Communication status (typically the fieldbus status) to the remote controller may be healthy.
 2. Communication heartbeat from the remote system may be healthy.
 3. Ready flag from the remote system may be true.
 4. Ready flag from the rig control system actuator may be true.
 5. No high priority alarms may be present in the rig control system actuator.
 6. No local interaction may be taking place in the rig control system
 7. The authority request from the driller is received.

The rig control system actuator signals to the remote-control system that it is authorized using an "authorized status" flag. This is done for each actuator.

For authority revoking, global and local authority revocation may be employed selectively. Global authority revoking (or "utilization") is when authority is revoked to the actuators (Drawworks, Pumps, Top Drive) at the same time. Local authority revoking this is when authority is revoked to a single actuator at a time.

Local authority to one actuator can be revoked at any time if any of the following condition is met: 1. The authority disable request from the driller is received for that actuator. Similarly, the global authority can be revoked at any time if any of the following condition is met:
 1. Communication status (typically the fieldbus status) to the remote controller is unhealthy.
 2. Communication heartbeat from the remote system is unhealthy.
 3. Ready flag from the remote system is false.
 4. Ready flag from the rig control system actuator is false.
 5. High priority alarms are present in the rig control system actuator.
 6. A local interaction takes place in the rig control system Mud Pumps The IO interface may provide variables to cover aspects related to mud pumps control and the mud pump system. Note that the mud pumps collectively may be seen as a single actuator from the remote system point of view, regardless of the number of pumps. The supervisory system commands a desired overall flow rate and the rig control system handles control of each pump.

The mud pump control by the process control system may include fast update statuses (may be exchanged at maximum allow cyclic rate between Remote control system and rig control system). Such status may provide whether control is authorized, fault status, setpoint, flow rate, sensor utilization, combinations thereof, and/or the like. In this context, "utilization": refers to any local interaction with a control on the rig control system that removes authority to the supervisory system.

The following describes sub system state prior to granting authority to DrillOps, any utilization condition being present may prevent authority from being granted. The Mud Pump system maybe on and ready to pump, or already pumping for authority to be granted to DrillOps. If the Mud Pump system is pumping while authority is granted to DrillOps, pumping may continue unchanged. The safe state for the mud pumps may be to remain in last state (i.e. pump at same rate as before safe state).

Top Drive

The following variables may cover aspects related to Top Drive. Note that the rotation direction is left out on purpose to minimize risks of twist off in case of incorrect direction sent from the remote-control system. The Top Drive may be controlled in clockwise mode, or any other direction. Commands to the top drive may include rotation, torque, and/or fault setpoints. Outputs may include heartbeats, echoes, ready-notifications, command status, torque, speed, rotation direction, acceleration, in-slips, etc.

The following describes sub system state prior to granting authority to DrillOps, any utilization condition being present may prevent authority from being granted. The Top Drive may be on and ready to rotate in the clockwise direction with the brake released, or already rotating in the clockwise direction for authority to be granted to DrillOps. If the Top Drive is rotating while authority is granted to DrillOps, rotation may remain unchanged. The safe state for the top drive may be to remain in last state (i.e.: rotate at same speed as before safe state).

Drawworks and Autodriller

The following document describes the interface between the remote-control system and the Drawworks actuator. The interface encompasses both absolute movement and autodriller interfaces. Autodriller movement direction is always lowering the block. A relative movement interface is not provided to limit the risk of sending repetitive commands in error, having the effect of moving the block further than intended.

Various commands may be sent to/from the autodriller, such as WobReset, which resets the WOB reference with the value passed as parameter. Upon receiving this command, the rig control system may use it in its WOB measurement with WOB=HookloadReference−Hookload. Upon applying it, the rig control system may also update in the hookloadReferenceSetppoint OPC-UA output with the received value. Various other commands may include hookload setpoints, fault conditions, movement of the block/drawworks, block position, weight on bit (WOB) setpoints, block/drawworks status, etc.

In order for authority to be granted the the drawworks may not be moving, not parked and with the brake released for authority to be granted for DrillOps control. Further, the autodriller may be stopped or running for authority to be granted, if the autdriller (AD) is running at the time authority is granted, the autodriller may stop movement. Note: if the autodriller is equipped with differential pressure or td torque control loops, they may be turned off before authority can be granted to DrillOps. The safe state for the drawworks may be to stop movement of the travelling assembly.

Depth Management

The following is optional to implement. It depends whether the rig control system has the capability/need of tracking depth. The following variables are required to cover depth management. Indeed, the driller has the choice to manage bit depth and hole depth either from the remote-control system or from the rig control system directly. This is a setting to a setting on the rig control system itself. This may not be part of the authority aspect because the driller interaction with the system may not revert control to the local rig control system. If the depth is managed in the remote control system, the block position and hookload may be sent to the remote control system at a relatively high frequency (20 Hz or more).

The gateway may receive inputs related to bit depth computer by the rig control system and/or hole depth from the same. Fast update statuses (may be exchanged at maximum allow cyclic rate between Remote control system and rig control system) may include bit depth, ho depth, heartbeat, echo, status of the remote depth management, etc.

The safe state for the depth management is to revert to the local rig control system controlling the depth. This happens if the remote system heartbeat goes stale or if communication loss between Presto and the rig control system is detected. If remote depth has been selected by the driller and local (rig control system) utilization occurs, remote depth may remain selected. If remote depth has been selected by the driller and the ready flag from Presto goes false, remote depth may remain selected.

Config Variables for Each Equipment

Any equipment (Mud Pumps, Top Drive, Derricks, etc.) that has commands with integer or float parameters, has a configuration section of variables where, for each of the parameters in the commands of the equipment, a pair of variables representing the min/max values for this parameter can be read from the rig control system. This is read on a need-basis by DrillOps, and is used to add a Warning entry in DrillOps. The rig control system is still the one enforcing that the parameters out of range are clipped properly before executing any command.

Remote Monitoring Measurements

In the rig control system interface, generic measurements that are available to DrillOps may be specified for monitoring purpose. These measurements may be acquired at a slow acquisition rate (e.g., 1 Hz or less). These measurements may be declared in the RemoteMonitoring/Outputs section of the rig control system Rig Control System User Interface Interactions On the driller's rig control system human-machine interface (HMI) there may be a mechanism for granting authority to the supervisory system (DrillOps, for example). For example, the HMI may include a button for global remote-control enablement. This button is greyed out if remote system Ready flag and heartbeat are unhealthy. Otherwise, It can be pressed. If pressed, it becomes activated and enables the other buttons below. The HMI may also include one or more buttons per actuator (Drawworks, Mud pumps, Top Drive). These buttons remain greyed out until the global control enablement is activated. When activated, these buttons can be pressed. If pressed, and if remote system Ready flag and heartbeat are healthy, they turned activated and activate the authority granted flag to the corresponding actuator. Refer to the specific rig control system Functional Description to be developed with the equipment vendor for the specific integration project.

The HMI may also include alarms related to DrillOps, which may be displayed. This dialog may include conditions that can prevent authority from being granted, conditions that cause authority to be revoked, communication related faults, utilization related faults, and interlocks that can prevent DrillOps functions.

Control Methods

This section contains data variables that may be commanded by DrillOps for each individual method as well as rig control system data related to the execution of each control method. In addition, a display for each setpoint min/max value may be provided for troubleshooting purposes. The variables and composition of the methods may vary depending on the individual rig control system implementation. If depth management is supported, a depth management control may be added to the rig control system HMI. A selector allows to choose between local depth or remote-control system depth.

Computing Environment

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
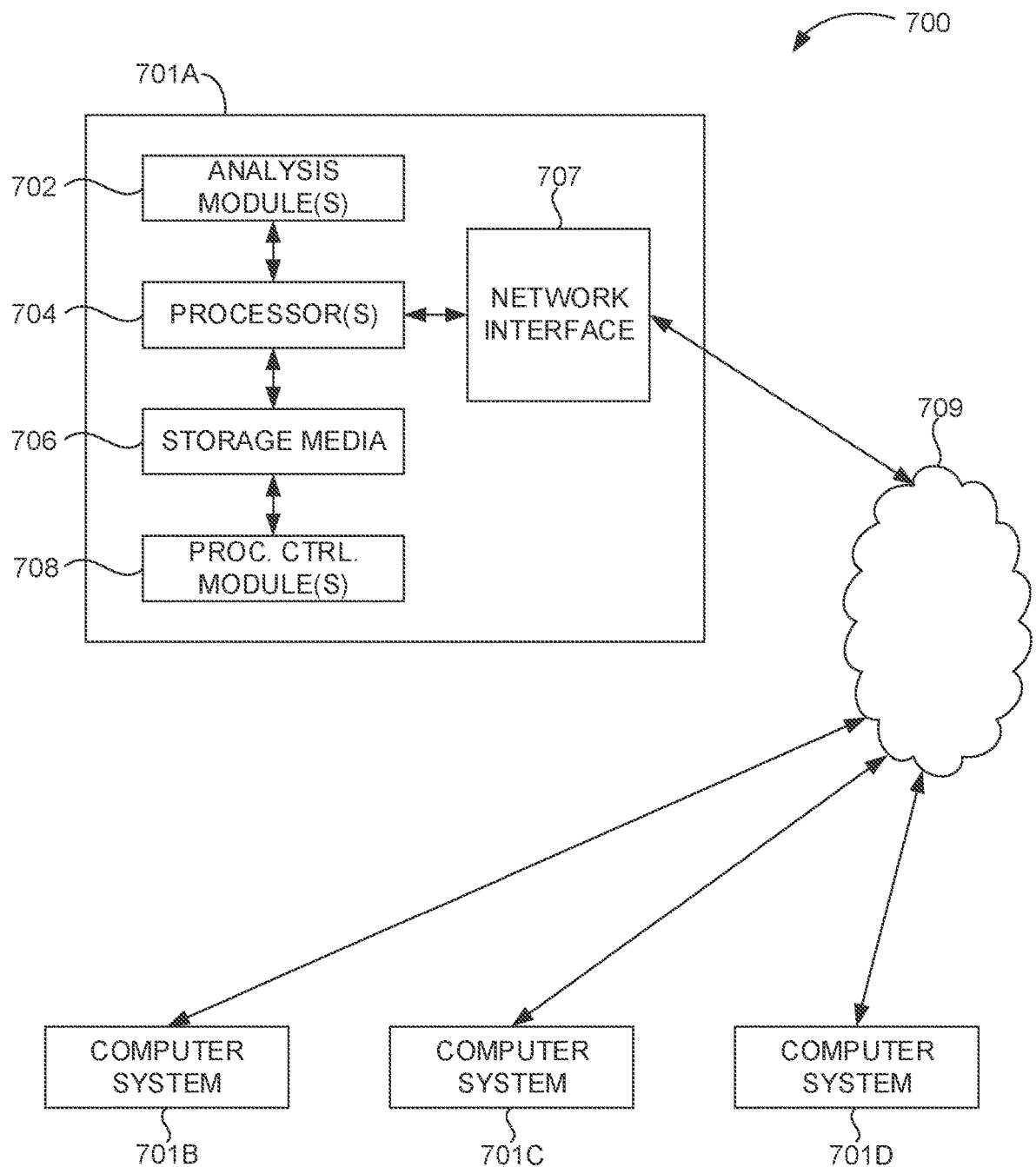
FIG. 7 illustrates a schematic view of a computing system, according to an embodiment.

In some embodiments, any of the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis module(s) 702 configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY© disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 700 contains one or more process control module(s) 708. In the example of computing system 700, computer system 701A includes the process control module 708. In some embodiments, a single process control module may be used to perform some or all aspects of one or more embodiments of the methods. In alternate embodiments, a plurality of process control modules may be used to perform some or all aspects of methods.

It should be appreciated that computing system 700 is only one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Although only a few examples have been described in detail above, those skilled in the art may readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words "means for" together with an associated function.

What is claimed is:

1. A method for controlling a drilling rig, comprising:
   receiving a first message-based command from a supervisory system at a first gateway;
   determining a first system-specific command of a first system-specific controller based on the first message-based command and a first map using the first gateway, wherein the first gateway comprises the first map between at least the first message-based command of the supervisory system and at least the first system-specific command of the first system-specific controller, and the first message-based command is not compatible with the first system-specific controller; and
   transmitting the first system-specific command from the first gateway to the first system-specific controller, wherein the first system-specific controller is configured to execute the first system-specific command by controlling first rig equipment;

receiving a second message-based command from the supervisory system at a second gateway;

determining a second system-specific command of a second system-specific controller based on the second message-based command and a second map using the second gateway, wherein the second gateway comprises the second map between at least the second message-based command of the supervisory system and at least the second system-specific command of the second system-specific controller, and the first and second message-based commands are not compatible with the second system-specific controller; and transmitting the second system-specific command to the second system-specific controller, wherein the second system-specific controller is configured to control different equipment than the first system-specific controller is configured to control, wherein the second system-specific controller is configured to execute the second system-specific command.

2. The method of claim 1, further comprising:

receiving feedback information from the first system-specific controller at the first gateway; determining a response message based on the feedback information using the first gateway; and transmitting the response message to the supervisory system.

3. The method of claim 1, wherein the first gateway has the first map between a plurality of different message-based commands of the supervisory system and a plurality of system-specific commands of one or more system-specific controllers including the first system-specific controller, and the plurality of message-based commands is not compatible with the one or more system-specific controllers.

4. The method of claim 1, wherein the first rig equipment comprises at least one of a top drive, a drawworks, a mud pump, an autodriller, or a depth manager.

5. The method of claim 1, wherein the first message-based command comprises a command to report a status of or feedback from the first rig equipment.

6. The method of claim 1, further comprising validating a prospective connection between the supervisory system, the first gateway, and the first system-specific controller manually using one or more certificates.

7. The method of claim 1, further comprising determining a plurality of system-specific commands that implement a plurality of different message-based commands in the first gateway, such that the first system-specific command is associated with the first message-based command and the first system-specific command is not associated with others of the plurality of different message-based commands.

8. A control system for a drilling rig, comprising:

a supervisory system configured to implement a well plan by generating message-based commands for execution using first rig equipment; and a first system-specific controller in communication with the supervisory system and the control system for the drilling ring comprising steps of:

receiving a first message-based command from the supervisory system at a first gateway;

determining a first system-specific command of the first system-specific controller based on the first message-based command and a first map using the first gateway, wherein the first gateway comprises the first map between at least the first message-based command of the supervisory system and at least the first system-specific command of the first system-specific controller, and the first message-based command is not compatible with the first system-specific controller; and transmitting the first system-specific command from the first gateway to the first system-specific controller, wherein the first system-specific controller is configured to execute the first system-specific command by controlling the first rig equipment;

receiving a second message-based command from the supervisory system at a second gateway;

determining a second system-specific command of a second system-specific controller based on the second message-based command and a second map using the second gateway, wherein the second gateway comprises the second map between at least the second message-based command of the supervisory system and at least the second system-specific command of the second system-specific controller, and the first and second message-based commands are not compatible with the second system-specific controller; and transmitting the second system-specific command to the second system-specific controller, wherein the second system-specific controller is configured to control different equipment than the first system-specific controller is configured to control, wherein the second system-specific controller is configured to execute the second system-specific command.

9. The control system of claim 8, wherein the message-based commands are standardized in a universal language and readable by a plurality of other gateways, the message-based commands are not compatible with different system-specific controllers, and wherein the system-specific commands are not standardized for use by the different system-specific controllers.

10. The control system of claim 8, further comprising a plurality of system-specific controllers including the first system-specific controller, wherein each of the plurality of system-specific controllers includes a specific gateway that maps the message-based commands with system-specific commands.

11. The control system of claim 8, wherein the first gateway is configured to communicate message-based signals representing feedback from or a status of the first rig equipment to the supervisory system.

12. The control system of claim 8, wherein the first rig equipment is selected from a group consisting of a top drive, a drawworks, a mud pump, an autodriller, and a depth manager.

13. A non-transitory computer-readable medium storing instructions that, when executed by at least one processor of a computing system, cause the computing system to perform operations, the operations comprising:

receiving a first message-based command from a supervisory system at a first gateway;

determining a first system-specific command of a first system-specific controller based on the first message-based command and a first map using the first gateway, wherein the first gateway comprises the first map between at least the first message-based command of the supervisory system and at least the first system-specific command of the first system-specific controller, and the first message-based command is not compatible with the first system-specific controller; and transmitting the first system-specific command from the first gateway to the first system-specific controller, wherein the first system-specific controller is configured to execute the first system-specific command by controlling first rig equipment;

receiving a second message-based command from the supervisory system at a second gateway;

determining a second system-specific command of a second system-specific controller based on the second message-based command and a second map using the second gateway, wherein the second gateway comprises the second map between at least the second message-based command of the supervisory system and at least the second system-specific command of the second system-specific controller, and the first and second message-based commands are not compatible with the second system-specific controller; and transmitting the second system-specific command to the second system-specific controller, wherein the second system-specific controller is configured to control different equipment than the first system-specific controller is configured to control, wherein the second system-specific controller is configured to execute the second system-specific command.

14. The medium of claim 13, wherein the operations further comprise:
receiving feedback information from the first system-specific controller at the first gateway;
determining a response message based on the feedback information using the first gateway; and
transmitting the response message to the supervisory system.

15. The medium of claim 13, wherein the first gateway has the first map between a plurality of different message-based commands of the supervisory system and a plurality of system-specific commands of one or more system-specific controllers including the first system-specific controller, and the plurality of message-based commands is not compatible with the one or more system-specific controllers.

16. The medium of claim 13, wherein the first rig equipment comprises at least one of a top drive, a drawworks, a mud pump, an autodriller, or a depth manager.

17. The medium of claim 13, wherein the first message-based command comprises a command to report a status of or feedback from the first rig equipment.

18. The medium of claim 13, wherein the operations further comprise determining a plurality of system-specific commands that implement a plurality of different message-based commands using the gateway.

* * * * *